United States Patent [19]

Lorbiecki

[11] Patent Number: 5,154,393
[45] Date of Patent: Oct. 13, 1992

[54] SEAT SUSPENSION WITH DOWNSTOP SLIDE ELEMENT FOR AUTOMATIC SLIDE GAP ADJUSTMENT

[75] Inventor: James R. Lorbiecki, Milwaukee, Wis.

[73] Assignee: Milsco Manufacturing Company, Milwaukee, Wis.

[21] Appl. No.: 799,057

[22] Filed: Nov. 27, 1991

[51] Int. Cl.[5] .............................................. F16M 13/00
[52] U.S. Cl. ..................... 248/576; 248/157; 248/581; 297/308; 297/345; 384/34; 384/40
[58] Field of Search ............... 248/157, 297.3, 576, 248/577, 581, 162.1, 407, 408, 409; 297/345, 307, 308; 384/34, 40

[56] References Cited

U.S. PATENT DOCUMENTS

| | | | |
|---|---|---|---|
| 3,291,525 | 12/1966 | Fritzmeier | 297/308 |
| 3,326,603 | 6/1967 | Lehner | |
| 3,442,552 | 5/1969 | Lehner | |
| 3,572,828 | 3/1971 | Lehner | |
| 3,705,745 | 12/1972 | Ambrosius | |
| 3,861,637 | 1/1975 | Delongchamp | 248/576 |
| 3,954,298 | 5/1976 | Lowe | 297/308 |
| 4,186,963 | 2/1980 | Koutsky | |
| 4,662,597 | 5/1987 | Uecker | 297/307 X |
| 4,817,908 | 4/1989 | Hanlon et al. | 248/581 X |
| 4,838,514 | 6/1989 | Hill | 297/308 X |

Primary Examiner—David L. Talbott
Attorney, Agent, or Firm—Nilles & Nilles

[57] ABSTRACT

A seat suspension including a downstop slide element having an overall width that automatically adjusts to compensate for dimensional variations between relatively stationary and movable frame parts of the seat suspension due to manufacturing tolerances and wear. The downstop has first and second leaf members having spaced apart first and second top and bottom walls, front and rear walls, and inner and outer walls, respectively. A connecting member interconnects the leaf members to place the first and second inner walls in opposed confronting relation for movement toward and away from each other to form a longitudinally extending slide gap therebetween of variable width. A first biasing member is provided to normally urge the pair of leaf members apart. A first tapered portion is provided on the inner wall of at least one of the leaf members. A cam surface is provided on the front wall of at least one of the leaf members. A width adjuster is positioned in the slide gap between the confronting walls and includes a second tapered portion in face-to-face sliding engagement with the first tapered portion and a cam follower in contact with the front wall cam surface. A second biasing member is provided to normally bias the width adjuster to move the respective tapered portions relative to each other in a direction to cause the gap to widen and increase the overall width of the downstop slide element as required to compensate for dimensional differences between the parts due to tolerances and wear and provide lateral stability to the seat suspension.

15 Claims, 4 Drawing Sheets

SEAT SUSPENSION WITH DOWNSTOP SLIDE ELEMENT FOR AUTOMATIC SLIDE GAP ADJUSTMENT

BACKGROUND OF THE INVENTION

1. Field of the Invention

This invention relates to a downstop slide element usable in a vehicle seat suspension assembly to mount an intermediate frame part for reciprocal sliding movement on a stationary tower part of the seat assembly to compensate for tolerance and wear and to provide for lateral stability.

2. Description of the Related Art

Various types of seat suspension means are known for resiliently supporting a vehicle seat on a vehicle. It is known, for example, to secure a stationary tower frame part on the vehicle. The seat is secured to an intermediate frame part which is mounted for vertical reciprocal movement on the tower frame part by means of interfitting channels, rollers and slides carried by the respective frame parts. A spring suspension is interconnected between the tower and intermediate frame parts to provide floating vertical movement of the seat. Typical patents disclosing this type of seat suspension are U.S. Pat. No. 3,326,603, W. Lehner, issued June 20, 1967; U.S. Pat. No. 3,442,552, W. Lehner, issued May 6, 1969; U.S. Pat. No. 3,572,828, W. Lehner, issued Mar. 30, 1971; and U.S. Pat. No. 3,705,745, M. Ambrosius, issued Dec. 12, 1971.

While such mounting arrangements have been generally satisfactory, they have presented certain problems which have not only increased the cost of manufacture and assembly but have also caused operational and service problems. In seat assemblies of this general type, the seat is supported on the intermediate frame. Lateral stability of the seat, when occupied, that is, its resistance to transverse shifting and rocking when the vehicle goes over uneven ground and shifts the occupant's weight back and forth, depends upon a close tolerance fit between the channels, rollers and slides of the respective stationary and intermediate frame parts. The greater the play, the greater the amount of lateral instability. To solve this problem, the interfitting channels, rollers and slides are manufactured to very close tolerances which minimize lateral play between the two frames as they reciprocate relative to each other. This requires expensive high precision bending and fabrication fixtures and is more labor intensive. If close tolerances are not maintained, play exists and the seat will rock laterally and fatigue the occupant.

Even when close tolerances are maintained with expensive close tolerance manufacture, this lateral stability problem is not solved. During the life of the seat suspension, reciprocation of the intermediate frame relative to the tower frame will take place millions of times, causing wear which creates an ever increasing amount of play between the channels, rollers and slides. This inevitably results in an increase of lateral instability.

The above mentioned patents do not recognize this problem and make no provision for solving it other than by use of expensive close tolerance manufacture. U.S. Pat. Nos. 3,705,745, M. Ambrosius, issued Dec. 12, 1971 and 4,186,963, L. John Koutsky, issued Feb. 5, 1980 both disclose a seat suspension of this general type and recognize the problem of lateral instability. Ambrosius and Koutsky incorporate a third set of transverse rollers and guides in addition to the conventional two pairs of laterally spaced rollers. This third set of roller and roller guide structure adds to the complexity of the seat design and further increases the cost of manufacture and assembly. Close tolerance manufacture is still required and no provision is made to compensate for wear occurring during the operational life of the seat. Therefore, in spite of a high degree of technical development in the seat suspension field over many decades, the need still exists for a way to eliminate the requirements for close tolerance manufacture while providing compensation for manufacturing tolerances and wear in a simple, inexpensive manner to provide a durable rugged seat affording the occupant lateral stability.

SUMMARY OF THE INVENTION

The present invention provides a downstop slide element for a vehicle seat suspension assembly having an overall width that automatically adjusts to compensate for dimensional variations of a slide gap between relatively movable parts of a seat suspension due to manufacturing tolerance and wear. The downstop slide element comprises first and second leaf members having spaced apart first and second top and bottom walls, front and rear walls, and inner and outer walls, respectively; connecting means interconnecting the leaf members to place the first and second inner walls in opposed confronting relation for movement toward and away from each other to form a longitudinal gap therebetween of variable width; a first biasing means for normally urging the pair of leaf members apart; a first tapered portion on the inner wall of at least one of the leaf members; a cam surface on the front wall of at least one of said leaf members; a width adjuster means positioned in the gap between said confronting walls and including a second tapered portion in face-to-face sliding engagement with the first tapered portion and a cam follower means in contact with the front wall cam surface; and a second biasing means normally biasing the width adjuster to move the tapered portions relative to each other in a direction to cause the gap to widen and increase the overall width of the downstop slide element as required to compensate for dimensional differences existing between the parts due to tolerances and wear.

Preferably the connecting means will comprise an integral hinge means connected between the first and second rear walls of the leaf elements, with the integral hinge means being placed in tension when the downstop slide element is in an installed position between the relatively movable parts to thereby function as the first biasing means.

The first and second inner walls may each have a tapered portion thereon in confronting relation to each other to define a wedge-shaped gap therebetween with the width adjusting means including a wedge member mounted in the wedge-shaped gap and having outer faces in face-to-face sliding engagement with the tapered portions on the first and second inner walls.

The first and second tapered portions may each have teeth members thereon in interfitting relation that extend between the top and bottom walls transversely to the longitudinal gap to prevent relative sliding movement of said first and second tapered portions until a predetermined amount of dimensional variation exists. At least one and preferably both of the first and second inner surfaces of the leaf member are provided with a longitudinally extending guide groove. The width adjuster means includes a longitudinally extending guide tongue or tongues slidably mounted in said guide groove or grooves. One of the leaf members includes a retainer pin receiving slot extending longitudinally of said gap and opening onto said inner surface thereof and the width adjuster means includes a retainer pin slidably mounted in the pin receiving slot.

Preferably the second biasing means will comprise a U-shaped cantilever spring element having a mounting portion connected to the width adjuster means and deflectable arm portions that overlie the cam surface on the front wall. Each arm portion terminates in a free end in contact with the cam surface and functions as the cam follower means.

The mounting portion of the spring element is located intermediate said free ends and the first and second front walls are semicircular in shape to receive the spring arm free ends thereon.

The first and second leaf members have first and second mounting apertures that extend therethrough transversely to the longitudinal gap, said aperture having first and second axes that are coincident when the downstop slide element is in an installed position to permit a mounting rod to be slid therethrough. One of the leaf members has bumper mounting slots in the top and bottom walls thereof.

DESCRIPTION OF THE DRAWINGS

Referring to the drawings.

DESCRIPTION OF THE PREFERRED EMBODIMENT

Figure 1:
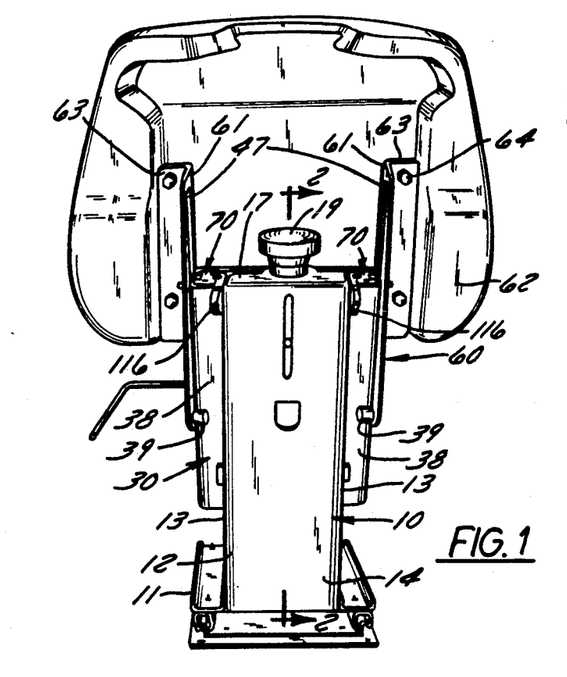
FIG. 1 an isometric projection rear view of a vehicle seat suspension incorporating the downstop slide element of the present invention.

Referring to FIGS. 1-4, the seat suspension broadly comprises a stationary tower frame means or part 10 adapted to be mounted on a vehicle such as a tractor, not shown; an intermediate frame means or part 30; a suspension means 40 for mounting the intermediate frame part 30 on the stationary tower part 10 for vertical reciprocating movement relative thereto; and a seat support frame 60 mounted on the intermediate frame part 30 with the seat support frame serving to mount the operator's seat 62, only the back of which is shown in FIG. 1.

The tower frame part 10 has a base member 11 and a vertical tower member 12 secured thereto. The tower member 12 includes a pair of laterally spaced side plates 13 connected by a back plate 14. An upper guide roller 16 (FIG. 2) is mounted on each of the side plates 13 and functions to mount the intermediate frame part 30 for reciprocal movement on the tower member 12, as will be more fully described hereinafter. The tower member 12 further includes top plate 17 having an aperture through which an adjusting shaft 18 passes. A spring tension adjusting knob 19 is connected to shaft 18. The side plates 13 each includes an aperture at the lower end thereof adjacent base member 11 for receiving a lower pivot shaft 21 therethrough on which a shock absorber 22 for dampening the seat floating movement is mounted.

Figures 2, 3, 6:
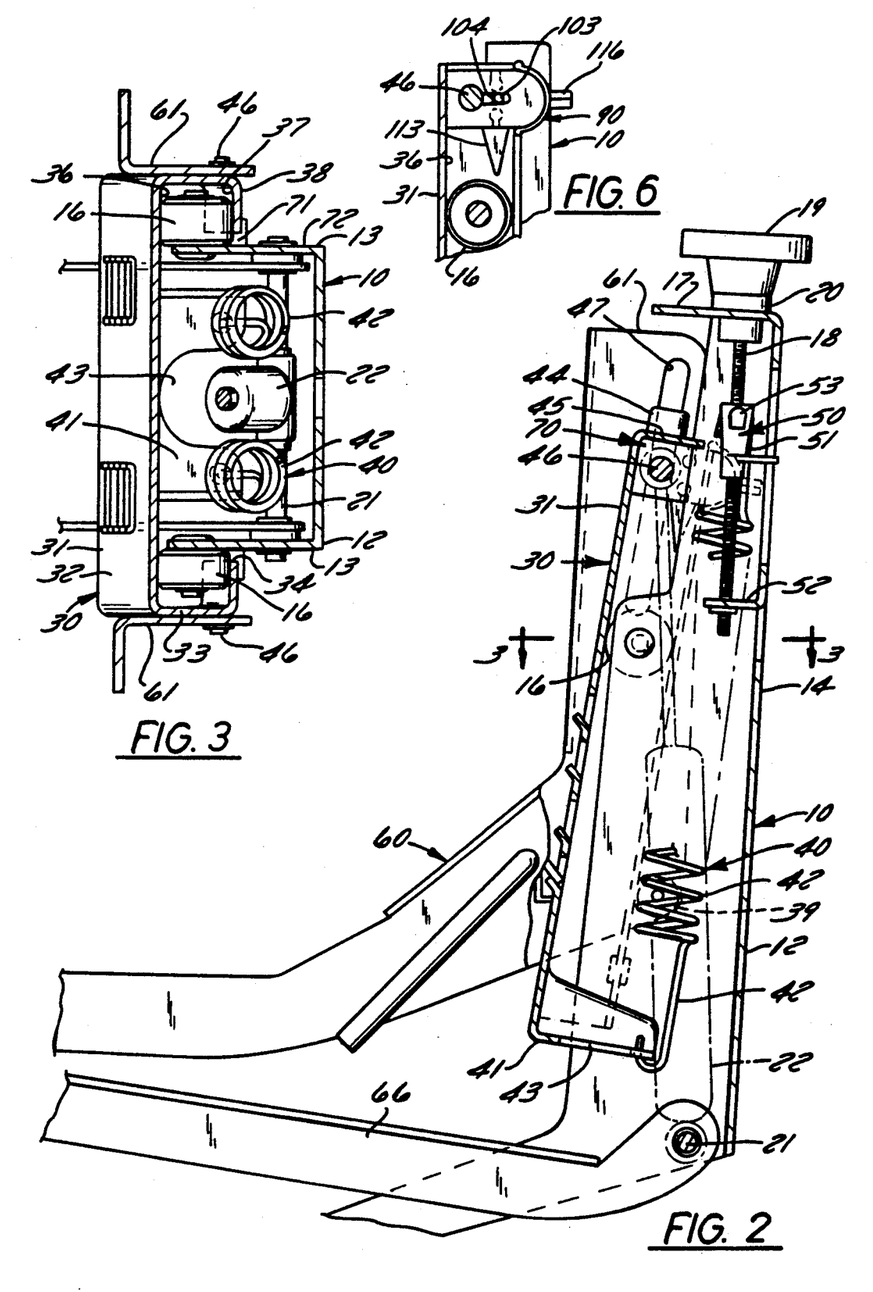
FIG. 2 is a partial sectional view taken along line 2—2 of FIG. 1.
FIG. 3 is a sectional view taken along line 3—3 of FIG. 2.
FIG. 6 is a partial sectional view taken along line 6—6 of FIG. 5.
Figure 4:
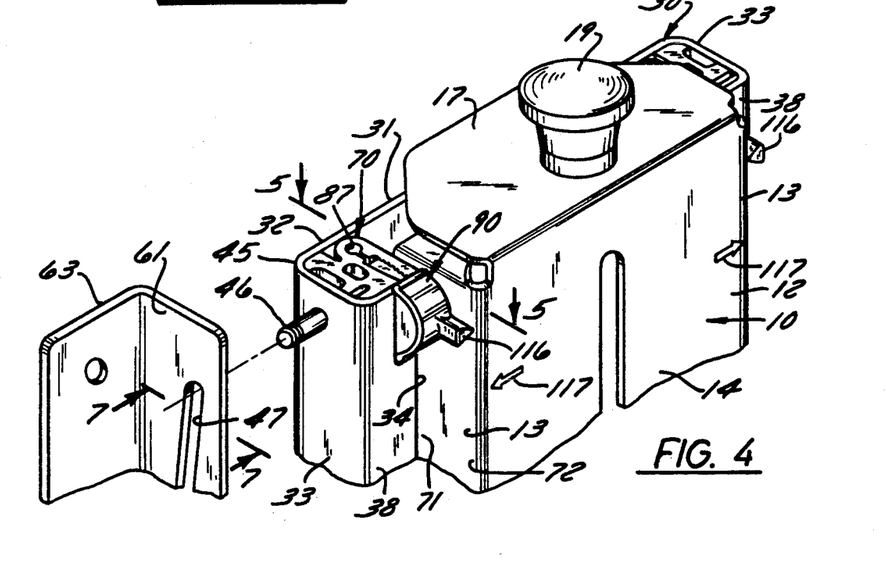
FIG. 4 is an enlarged partial isometric projection view of a portion of the seat suspension shown in FIG. 1.
Figure 5:
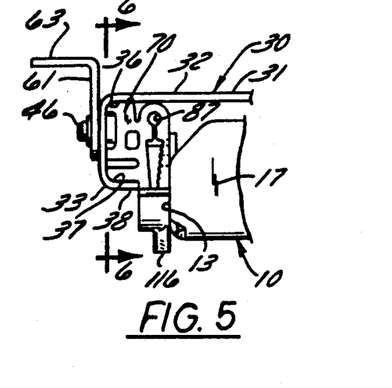
FIG. 5 is a top view of the left-hand portion of the seat suspension shown in FIG. 4.

The intermediate frame part 30 comprises a guide roller supported main channel member 31 best shown in FIGS. 3 and 4. The main channel member 31 includes a front wall 32 having laterally spaced side channels 33 in the form of U-shaped runners having open sides which face each other to define a space therebetween to receive tower member 12. Each side channel 33 includes a vertical extending inner edge 34 spaced from its side wall 13 of tower member 12; spaced apart facing inner surfaces 36 and 37; and a rear outer surface 38. The inner surfaces 36 and 37 are spaced apart to receive the upper guide rollers 16 therebetween. The rear outer surface 38 of each side channel 33 is adapted to engage a pair of transversely spaced lower guides 39, best shown in FIG. 1, carried by the seat support frame means 60. The channel member 31 also includes a bottom plate 41 in which the ends of main suspension springs 42 are anchored. The bottom plate 41 also has a relieved area 43 in order to provide operating clearance for shock absorber 22, as best appears in FIG. 3. The upper end 45 of the main side channel 31 is provided with an upstop bumper 44 (FIG. 2) which contacts the undersurface of top plate 17 of the tower part 10. The upper end of each side channel element 33 is also provided with an aperture adapted to receive a downstop mounting shaft 46 therethrough. The downstop mounting shaft 46 serves to mount downstops 70 as well as the upper end of the damper 22 on intermediate frame means 30. The downstop mounting shaft 22 also passes through slots 47 in the seat support frame means 50 and reciprocates therein to slidably interconnect the intermediate frame means 30 with the seat support frame means 50.

The suspension springs 42 constitute the suspension means 40 for mounting the intermediate frame means 30 on the tower frame part 10 for vertical floating movement relative thereto. The lower ends of the main springs 42 are secured to the bottom wall 41 of the channel member 31. The upper ends 51 of the suspension springs 42 are secured to the upper end of tower frame part 10 by means of a main spring tension adjusting assembly 50. The adjusting assembly 50 includes the adjusting knob 19; threaded shaft 18; a thrust bearing spacer 20 between knob 19 and top plate 17 through which shaft 18 passes; an apertured intermediate flange 52 projecting inwardly from back plate 14 of tower frame part 10 to rotatably support shaft 18; and a spring support yoke 53. The movable spring support yoke 53 is threadably mounted on shaft 18 and the upper ends of springs 42 are connected to the support yoke 53. Rotation of adjusting knob 19 will move spring support yoke 53 either upward or downward on the threaded shaft 18 to increase or decrease the tension and consequently the amount of lifting force that the springs 42 will apply to intermediate frame means 30.

The seat support frame 60 is slidably mounted on intermediate frame means 30 and includes a pair of side frame members 61 that are laterally spaced apart at a distance which permits channel member 31 to be slidably received therebetween. The side frame members 61 are each provided with the vertical slot 47 that receives the downstop mounting shaft 46 therethrough, as previously explained. The side frame members 61 also have the lower guides 39 rotatably mounted thereon. The slots 47, the lower guides 39, and the upper guide rollers 16 permit the seat support frame means 60 to freely slide vertically relative to intermediate frame means. The seat back 62 is mounted on seat back mounting flanges 63 which are part of the side frame members 61 by bolts 64 threaded into the seat back. The seat support frame means 60 also includes a swing arm seat support 66 extending forwardly from the tower assembly 10 to additionally support the seat pan and cushion, not shown.

Figure 7:
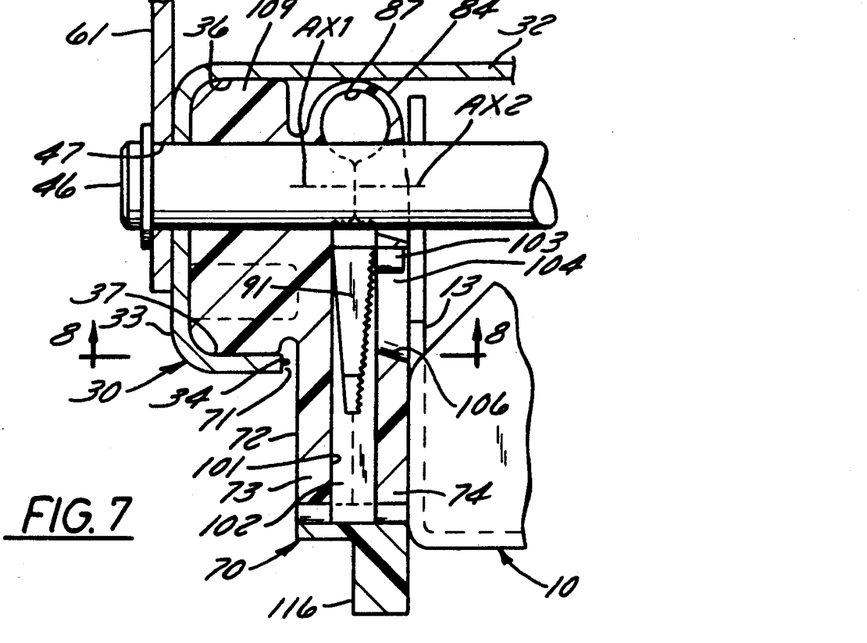
FIG. 7 is a partial sectional view taken along line 7—7 of FIG. 4 and showing the exploded parts in an assembled condition.

Referring to FIGS. 2, 4 and 6-11, a downstop slide element 70 is mounted at the top of each of the side channel members 33 of the intermediate frame channel 30 by means of the downstop mounting shaft 46 to stabilize the intermediate frame relative to the tower member against lateral instability. As best shown in FIGS. 3, 4 and 7, a large tolerance slide gap 71 exists between the vertical extending inner edge 34 of the U-shaped channel runner 33 and the outer surface 72 of the tower member 12. The downstop slide element 70 is mounted in the channel of U-shaped runner 33 and extends through the slide gap 71. The width of the downstop slide element 70 automatically adjusts to compensate for dimensional variations in the slide gap 71 and stabilize the intermediate frame part against lateral instability due to manufacturing tolerance and wear, as will now be described.

The downstop slide element 70 includes first and second leaf members 73 and 74 having spaced apart first and second top and bottom walls 76, 76A and 77, 77A, front and rear walls 78, 78A and 79, 79A and inner and outer walls 81, 81A and 82, 82A, respectively. A connecting means 84 interconnects the first and second leaf members 73 and 74 to place the first and second inner walls 81 and 82 in opposed confronting relation for movement toward and away from each other to form a longitudinal downstop gap 86 therebetween of variable width. The connecting means 84 may comprise an integrally molded hinge means 87 connected between the first and second rear walls 79, 79A of the leaf elements or it could assume another form provided, however, that whatever form of connecting means is used, it will provide for movement of the first and second leaf members 73, 74 toward and away from each other. A first biasing means in the form of the integral hinge 87 is provided for urging the pair of leaf members apart. The integral hinge means 87 is placed in tension when the downstop element 70 is compressed and placed in an installed position between the relatively movable frame parts 10 and 30 as will be more fully explained hereinafter. A biasing means separate from hinge 87 could be provided if desired.

A first tapered portion 88 is provided on the inner wall 81 or 82 of at least one of the leaf members and preferably both inner walls 81, 82 will have a tapered portion 88, 88A thereon. A cam surface 89 is provided on the front wall 78 of at least one of the leaf members 73 and preferably both of the front walls 78 and 79 will b provided with a cam surface 89. The tapered portion or portions 88, 88A on the inner walls 81 82 of the first and second leaf elements 73, 74, due to their confronting relation to each other, provides a wedge-shaped or tapered downstop gap 86 therebetween.

A width adjuster means 90 is positioned in the longitudinal downstop gap 86 between the confronting inner walls 81, 82 and includes wedge member 91 having a second tapered portion or portions 92, 92A in face-to-face sliding engagement with the first tapered portion or portions 88, 88A on the inner walls of the leaf elements. The width adjuster means 90 also includes a cam follower means 93 which is in contact with the front wall cam surface or surfaces 89. A second biasing means 94, as will be more fully explained hereinafter, is provided to normally bias the width adjuster 90 to move the tapered portion 91 thereon relative to tapered portion or portions 88, 88A in a direction which causes the longitudinal downstop gap 86 to widen and thereby increase the overall width of the downstop slide element 70 as required to compensate for dimensional differences that exist at slide gap 71 between the frame parts 10 and 30 due to initial manufacturing tolerances and subsequent wear which occurs during the life of the seat suspension.

As previously mentioned, the wedge member 91 has second opposed outer tapered portions 92, 92A that are in face-to-face sliding engagement with the first tapered portions 88, 88A of the first and second inner walls 81, 82 of the first and second leaf members. The first and second tapered portions 88A, 92A have a plurality of teeth 96 thereon in interfitting relation with each other with the teeth 96 extending between the top and bottom walls and generally transverse to the longitudinal direction of the downstop gap 86. The interfitting teeth members 96 prevent relative sliding movement of the first and second tapered portions until the dimension of downstop gap 71 is sufficient to allow the first and second leaf members 73, 74 to move away from each other to the extent that the facing teeth members 96 will no longer engage each other. When this condition exists, the wedge member 91 will be moved longitudinally of the downstop gap 86 by the second biasing means 94 to cause the downstop gap to widen and increase the overall width of the downstop slide element 70.

Figure 11:
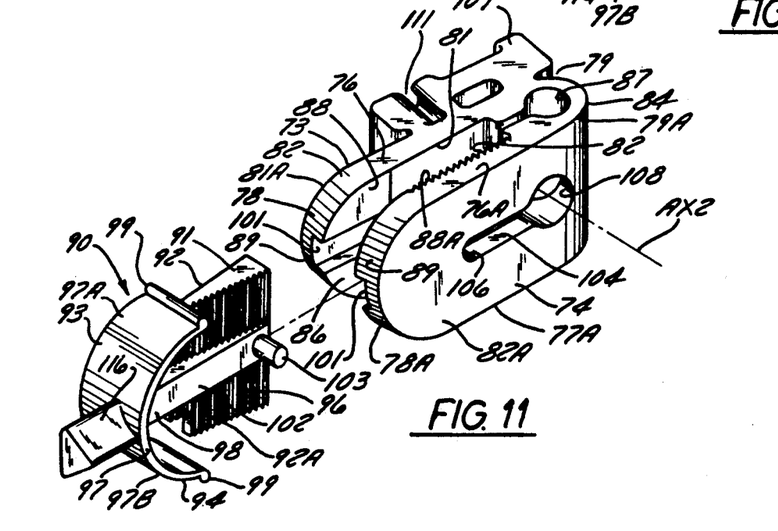
FIG. 11 is an isometric projection view showing the downstop stop element of FIG. 9 in disassembled condition.

As best appears in FIG. 11, the second biasing means 94 comprises a cantilever spring element 97 in the form of two cantilevered U-shaped arm portions 97A, 97B having a mounting portion 98 connected to the width adjuster means 90. The U-shaped arm portions terminate in spaced apart free ends 99. Each of the U-shaped arm portions are deflectable and overlie the cam surfaces 89 on the front walls 78, 78A of the first and second leaf members 73, 74. As disclosed, the spring element 97 overlies both of the front walls 78 and 78A, but it would be possible for the arm portions 97A, 97B to only overlie cam surfaces on one of the front walls. The mounting portion 98 is located intermediate the free ends 99. The free ends 99 are in sliding contact with the cam surfaces 89. While the first and second front wall cam surfaces are shown as semicircular in shape, it is obvious that other configurations could be provided.

Figure 8:
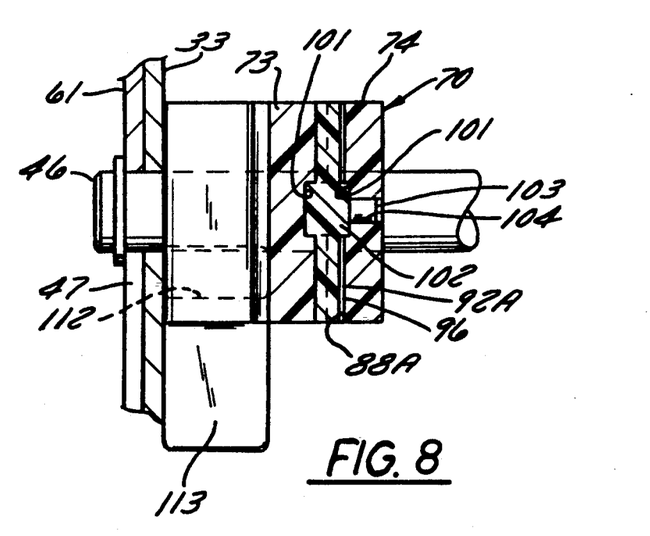
FIG. 8 is a sectional view taken along line 8—8 of FIG. 7.

As best appears in FIGS. 8 and 11, the first and second inner walls 81 and 82 of the leaf members 73 and 74 each has a longitudinally extending guide groove 101. If desired, only one guide groove 101 could be provided in one of the leaf members. The width adjuster means 90 includes a longitudinally extending guide tongue 102 which is slidably mounted in the guide grooves 101.

The width adjuster means 90 is retained in the longitudinal groove 101 by a retainer pin and slot assembly 103, 104 which will now be described. The second leaf member 74 is provided with the retainer pin receiving slot 104 extending in the direction of the longitudinal extent of the downstop gap 86. The slot 104 opens onto the inner surface 82 of the second leaf member 74. The wedge member 91 includes the retainer pin 103 which is slidably received in the pin receiving slot 104. When the wedge member 91 is assembled in the downstop gap 86 between the first and second leaf members 73 and 74, the retainer pin 103 will reciprocate back and forth within retainer pin slot 104 and contact of the pin 103 with the end 106 of slot 104 will prevent the wedge member from sliding completely out of the longitudinal slot.

The downstop slide element 70 is adapted to be mounted on the intermediate frame means 30 by the downstop mounting rod 46. More specifically, the first and second leaf members 73 and 74 each have first and second mounting apertures 107, 108 that extend therethrough transversely to the direction of the longitudinally extending gap 86. The apertures 107, 108 have first and second axes AX1 and AX2 that are noncoincident when the downstop element is in a relaxed, expanded, noninstalled condition. However, when the downstop element 70 is installed and the first and second leaf members are compressed with their outer walls 82, 82A parallel to each other, the first and second axes are generally coincident to permit the downstop mounting rod 46 to be slid therethrough. Sufficient play is provided between the rod 46 and apertures 107, 108 to permit the downstop 70 to expand for width adjustment.

Figure 10:
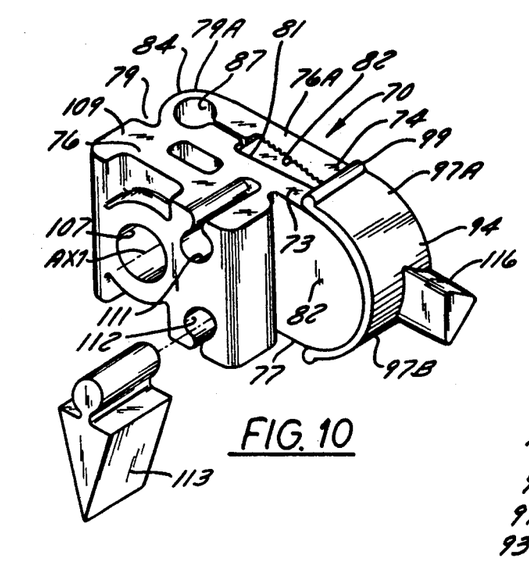
FIG. 10 is an isometric projection view of the downstop slide element shown in FIG. 9 further including a bumper element shown in exploded relation thereto.

As best shown in FIG. 10, the first leaf member 73 is provided with a mounting head portion 109 dimensioned to be snugly received in the U-shaped channel member 33. The first leaf member 73 also includes top and bottom bumper mounting slots 111 and 112 in the top and bottom walls 76 and 77 thereof. An elastomeric bumper 113 is retained in the bumper mounting slot and functions, as shown in FIG. 6, to contact the upper guide roller 16 when the intermediate frame 30 floats downward to provide a downstop limit for travel of the intermediate frame.

Figure 9:
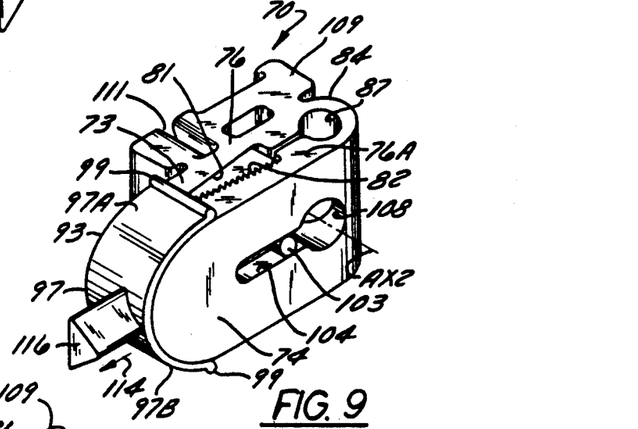
FIG. 9 is an isometric projection view of the downstop slide element incorporated in the seat assembly shown in FIG. 1.

The downstop slide element 70 is injected molded as one piece out of a suitable low friction plastic material or, if desired, the first and second leaf members and the width adjuster wedge member may be molded as two separate components. The downstop slide element 70 is reversible for either left- or right-hand installation. To assemble the downstop element into the seat suspension, the width adjusting means wedge member 91 is fully inserted into the longitudinal gap 86, as shown in FIGS. 9 and 10. The assembled downstop slide element 70 is mounted in the upper end of each of the channel members 33 of the intermediate frame means 30 with the mounting head 109 of each downstop slide element snugly received within the U-shaped portion of the channel member 33. Fully inserting the wedge member 91 into the longitudinal gap 86 causes the arcuate leaf springs 97A and 97B to deflect and conform to the cam surface 89 on the front walls 78 and 78A. In this condition, the second biasing means 94 normally tends to urge the wedge member 91 outwardly in the direction of arrow 114 (FIG. 9). Therefore, if any substantial play exists between the inner edge 34 of the intermediate channel member 33 and the outer surface 72 of the facing tower member side wall 13, the first biasing means 87 of the downstop slide element will cause wedge member 91 to move the first and second leaf members apart until they contact edge 34 and wall surface 72, respectively. This will increase the width of the longitudinal downstop gap 86, and if this increase of width is sufficient, the interfitting teeth 96 on wedge member 91 and inner walls 81 and 82 will disengage, thus allowing the stored tension in the arcuate spring arms 97, 97A to urge wedge member 91 outwardly of longitudinal gap 86 in the direction of arrow 114 until the respective teeth 96 engage each other. When this occurs, outward movement of wedge member 91 stops because the width of slide gap 71 between tower part 10 and intermediate frame part 30 has been filled by the downstop slide element 70. Minor width variations in the working gap during normal reciprocal operation will not allow the wedge member 70 to move further in an outward direction of arrow 114 because of the interfitting relationship of the teeth 96.

During normal floating reciprocating movement of the seat, the downstop slide element 70 will stabilize the intermediate frame member 30 laterally relative to the tower member part 10 and a normal desired optimum working clearance will be provided and maintained by the depth of the interfitting teeth 96. When wear occurs permitting the apex ends of opposing teeth 96 to clear each other, the arm spring 97, 97A will cause the wedge member 91 to move outwardly to increase the width of the longitudinal gap 86 and reestablish the optimum working clearance.

If desired, the width adjuster means may be provided with a visual indicator system 116, 117 (FIG. 4) to more accurately indicate the degree of downward suspension of the intermediate frame member due to the weight of the occupant in the seat. The spring suspension system can be set by adjusting knob 19 so that the indicator 116 will be at a midpoint in its vertical range of floating travel as indicated by arrow 117 when the seat is occupied.

What is claimed is:

1. A downstop slide element having an overall width that automatically adjusts to compensate for dimensional variations between relatively movable parts of a seat suspension due to manufacturing tolerance and wear comprising:

first and second leaf members having spaced apart first and second top and bottom walls, front and rear walls, and inner and outer walls, respectively;

connecting means interconnecting said leaf members to place said first and second inner walls in opposed confronting relation for movement toward and away from each other to form a longitudinally extending gap therebetween of variable width;

a first biasing means for normally urging said pair of leaf members apart;

a first tapered portion on said inner wall of at least one of said leaf members;

a cam surface on said front wall of at least one of said leaf members;

a width adjuster means positioned in said gap between said confronting walls and including a second tapered portion in face-to-face sliding engagement with said first tapered portion and a cam follower means in contact with said front wall cam surface; and a second biasing means normally biasing said width adjuster to move said first and second tapered portions relative to each other in a direction to cause said gap to widen and increase the overall width of said downstop slide element as required to compensate for dimensional differences between said parts due to tolerances and wear.

2. A downstop slide element according to claim 1 wherein said connecting means comprises an integral hinge means connected between said first and second rear walls of said leaf elements, said integral hinge means being placed in tension when said downstop slide element is in an installed position between relatively movable parts to thereby also constitute said first biasing means.

3. A downstop slide element according to claim 1 wherein
said first and second inner walls each have a tapered portion thereon in confronting relation to each other to define a wedge-shaped gap therebetween; and
said width adjusting means includes a wedge member mounted in said wedge-shaped gap and having outer faces in face-to-face sliding engagement with said tapered portions on said first and second inner walls.

4. A downstop slide element according to claim 1 wherein said first and second tapered portions each have first and second teeth members thereon in interfitting relation that extend between said top and bottom walls, said interfitting teeth members preventing relative sliding movement of said first and second tapered portions until an amount of dimensional variation exists sufficient to allow the first and second leaf members to move away from each other to the extent that the first teeth members will no longer contact the second teeth members.

5. A downstop slide element according to claim 1 wherein
said second biasing means comprises a cantilever spring element having a mounting portion connected to said width adjuster means and a deflectable arm portion overlying said cam surface on said front wall that terminates in a free end in contact with said cam surface; and
said cam follower means comprises said free end of said spring arm.

6. A downstop slide element according to claim 5 wherein
said cantilever spring element comprises a U-shaped arm portion terminating in two spaced apart free ends;
said mounting portion is located intermediate said free ends; and
said first and second front walls are semicircular in shape to receive said spring arm free ends thereon.

7. A downstop slide element according to claim 1 wherein
at least one of said first and second inner surfaces of said leaf member has a longitudinally extending guide groove; and said width adjuster means includes a longitudinally extending guide tongue slidably mounted in said guide groove.

8. A downstop slide element according to claim 7 wherein
both of said first and second inner surfaces have a guide groove therein; and
width adjuster means includes a wedge member having opposed outer faces with a guide tongue on each of said outer faces in slidable interfitting relation with one of said guide grooves.

9. A downstop slide element according to claim 8 wherein said first and second leaf members have first and second mounting apertures that extend therethrough transversely to said longitudinal gap, said apertures having first and second axes that are coincident when said downstop slide element is in an installed position to permit a mounting rod to be slid therethrough.

10. A downstop slide element according to claim 9 wherein
one of said leaf members includes a retainer pin receiving slot extending longitudinally of said gap and opening onto said inner surface thereof; and
said width adjusting means includes a retainer pin slidably mounted in said pin receiving slot.

11. A downstop slide element according to claim 1 wherein one of said leaf members has top and bottom bumper mounting slots in said top and bottom walls thereof.

12. A seat suspension assembly for a vehicle seat comprising:
a stationary support frame means adapted to be mounted on the vehicle;
an intermediate frame means having a channel means thereon;
a suspension means mounting said intermediate frame channel means on said stationary support means for vertical sliding movement relative thereto with a slide gap existing between said channel means and said stationary support means;
a seat support frame means mounted on said intermediate frame; and
a downstop slide element mounted on said slide gap between said stationary support means and said channel means, said slide element having an overall width that automatically adjusts to fill said slide gap to compensate for dimensional variations therein due to manufacturing tolerances and wear and minimize lateral instability between said stationary and intermediate frame means.

13. A seat suspension assembly according to claim 12 wherein said channel means includes a pair of U-shaped channel elements in spaced facing relation to each other with said stationary support lying between said channel elements, said channel elements each having an upper end, and said downstop slide element being mounted adjacent the upper end of each of said channel elements.

14. A seat suspension assembly according to claim 12 wherein said downstop slide element comprises:
first and second leaf members having spaced apart first and second top and bottom walls, front and rear walls, and inner and outer walls, respectively;
connecting means interconnecting said leaf members to place said first and second inner walls in opposed confronting relation for movement toward and away from each other to form a longitudinally extending gap therebetween of variable width;

a first biasing means for normally urging said pair of leaf members apart;

a first tapered portion on said inner wall of at least one of said leaf members;

a cam surface on said front wall of at least one of said leaf members;

a width adjuster means positioned in said gap between said confronting walls and including a second tapered portion in face-to-face sliding engagement with said first tapered portion and a cam follower means in contact with said front wall cam surface; and a second biasing means normally biasing said width adjuster to move said tapered portions relative to each other in a direction to cause said gap to widen and automatically increase the overall width of said downstop slide element as required to compensate for dimensional differences in said slide gap due to tolerances and wear.

15. A seat suspension assembly according to claim 13 wherein said connecting means comprises an integral hinge means connected between said first and second rear walls of said leaf elements, said integral hinge means being placed in tension when said downstop slide element is in an installed position between relatively movable parts to thereby also constitute said first biasing means.

* * * * *